(12) United States Patent
Schildkraut et al.

(10) Patent No.: US 7,623,692 B2
(45) Date of Patent: Nov. 24, 2009

(54) PULMONARY NODULE DETECTION IN A CHEST RADIOGRAPH

(75) Inventors: Jay S. Schildkraut, Rochester, NY (US); Michael D. Heath, Rochester, NY (US); Robert A. Senn, Pittsford, NY (US); Joseph F. Revelli, Jr., Rochester, NY (US); Brette Luck, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 509 days.

(21) Appl. No.: 11/187,676

(22) Filed: Jul. 22, 2005

(65) Prior Publication Data

US 2007/0019852 A1 Jan. 25, 2007

(51) Int. Cl.
*G06K 9/00* (2006.01)
(52) U.S. Cl. ..................................... 382/128
(58) Field of Classification Search ......... 382/128–132, 382/173, 308, 254, 274–275, 256–266
See application file for complete search history.

(56) References Cited

U.S. PATENT DOCUMENTS

| | | | |
|---|---|---|---|
| 4,907,156 A * | 3/1990 | Doi et al. ..................... 382/130 |
| 5,289,374 A | 2/1994 | Doi et al. | |
| 5,633,509 A * | 5/1997 | Takeo ......................... 250/584 |
| 5,987,094 A * | 11/1999 | Clarke et al. ................. 378/62 |
| 6,058,322 A | 5/2000 | Nishikawa et al. | |
| 6,078,680 A | 6/2000 | Yoshida et al. | |
| 6,088,473 A | 7/2000 | Xu et al. | |
| 6,125,194 A | 9/2000 | Yeh et al. | |
| 6,141,437 A | 10/2000 | Xu et al. | |
| 6,240,201 B1 | 5/2001 | Xu et al. | |
| 6,470,092 B1 | 10/2002 | Li et al. | |
| 6,549,646 B1 | 4/2003 | Yeh et al. | |
| 6,654,728 B1 | 11/2003 | Li et al. | |
| 6,683,973 B2 | 1/2004 | Li et al. | |
| 6,754,380 B1 | 6/2004 | Suzuki et al. | |
| 6,760,468 B1 * | 7/2004 | Yeh et al. ..................... 382/132 |
| 2003/0095696 A1 | 5/2003 | Reeves et al. | |
| 2005/0171409 A1 * | 8/2005 | Arimura et al. ............. 600/300 |
| 2005/0254075 A1 * | 11/2005 | Nagao ......................... 358/1.9 |
| 2006/0122480 A1 * | 6/2006 | Luo et al. ..................... 600/407 |
| 2007/0140541 A1 * | 6/2007 | Bae et al. ..................... 382/131 |

OTHER PUBLICATIONS

Shoji K. et al. (Computerized detection of pulmonary nodules by single exposure dual-energy computed radiography of the chest (Part 1), Sep. 9, 2002), European Journal of Radiology 44 (2002) 198-204.*

(Continued)

*Primary Examiner*—Sherali Ishrat

(57) ABSTRACT

A method of generating a pulmonary nodule image from a chest radiograph. The method includes the steps of: producing a map of a clear lung field; removing low frequency variation from the clear lung field to generate a level image; and performing at least one grayscale morphological operation on the level image to generate a nodule-bone image. Pulmonary nodules can be detected using the nodule-bone image by the further steps of: pulmonary nodules from a chest radiograph. The method includes the steps of: identifying candidate nodule locations in the nodule-bone image; segmenting a region around each candidate nodule location in the nodule-bone image; and using the features of the segmented region to determine if a candidate is a nodule.

9 Claims, 8 Drawing Sheets

OTHER PUBLICATIONS

J. Serra, "IMage Analysis and Mathematical Morphology", vol. 1, Acedemic Press, 1982, pp. 34-62.

J. Serra, "Image Analysis and Mathematical Morphology", vol. 1, Acedemic Press, 1982, pp. 424-478.

Vincent and Soille, "Watersheds in Digital Spaces: An Efficient Algorithm Based on Immersion Simulations", IEEE Trans.Patt. Analy. Machine Intell., vol. 13, No. 6, pp. 583-598, 1991.

Bevk et al., "A Statistical Approach to Texture Description of Medical Images: A Preliminary Study", 15th IEEE Symposium on Computer Based Medical Systems, Jun. 4-7, 2002.

Haralick et al., "Tecture Features for Image Classification", IEEE Transactions on Systems, Man, Cybernetics, pp. 610-621, 1973.

Abmayr et al., "Local Polynomial Reconstruction of Intensity data as basis of detecting homologous points and contours with subpixel accuracy applied on IMAGER 5003", proceedings of the ISPRS working group V/1, Panoramic Photogrammetry Workshop, vol. XXXIV, Part 5/W16, Dresden, 2004.

Canny, "A Computational Approach to Edge Detection", IEEE Transactions on Pattern Analysis and Machine Intelligence, vol. 8, No. 6, 1986.

Anil et al., "Statistical Pattern Recognition: A Review", IEEE Transactions on Pattern Analysis and Machine Intelligence, vol. 22, No., pp. 4-37, 2000.

Kenji Suzuki et al., False-positive Reduction in Computer-aided Diagnostic Scheme for Detecting Nodules in Chest Radiographs by Means of Massive Training Artificial Neural Network, pp. 191-201, Academic Radiology, vol. 12, No. 2, Feb. 2005.

Kunio Doi Ph.D., et al., Utilization of Digital Image Data for Computer-Aided Diagnosis, pp. 128-135, IEEE, 1990.

Shih-Chung B. Lo, et al., Extraction of Rounded And Line Objects for the Improvement of Medical Image Pattern Recognition, pp. 1802-1806, IEEE 1995.

Qiang Li et al., Selective enhancement filters for nodules, vessels, and airway walls in two-and three-dimensional CT scans, pp. 2040-2051, Med. Phys. 30 (8) Aug. 2003.

\* cited by examiner

PULMONARY NODULE DETECTION IN A CHEST RADIOGRAPH

FIELD OF THE INVENTION

The invention relates generally to the field of computer aided detection, and more particularly to the detection of pulmonary nodules in a chest radiograph.

BACKGROUND OF THE INVENTION

Lung cancer affects both men and women. At least one set of statistics has claimed that 90,363 men and 65,606 women died from lung cancer in the United States in 2001. It is believed that the early detection of lung cancer can increase the five-year survival rate from 12% to 70%. Screening for lung cancer can help with early detection.

Projection radiographs of the chest can be used for screening for lung cancer. In a chest radiograph, lung cancer appears as opaque, lumpy, nodules within the lung. When nodules in chest radiographs are detected, further steps can taken to diagnose the pulmonary nodule as benign or malignant and treat the patient accordingly. However, for a variety of reasons including viewer fatigue and nodule occlusion by ribs, nodules can go undetected in chest radiographs. Some statistics indicate that physicians miss approximately 30% of nodules in chest radiographs. In such cases, the cancer could go untreated and the patient's chance of surviving the cancer could be reduced.

Computer assisted detection or computed aided detection (CAD) has been employed to decrease a false negatives in lung cancer detection. CAD can help physicians find pulmonary nodules and consequently increase a patient's chance of surviving lung cancer.

U.S. Pat. No. 5,987,094 (Clarke) is directed to a computer-assisted method and apparatus for the detection of lung nodules.

U.S. Pat. No. 6,240,201 (Xu) is directed to a method for nodule detection in chest radiographs. The method employs a soft tissue image in addition to a standard radiograph, which is not always available.

In the CAD method disclosed in U.S. Pat. No. 6,141,437 (Xu), several thresholds are applied to a radiograph to identify candidate nodule regions. However, it has been viewed that applying one or more thresholds to an image may not be sufficient means of nodule segmentation.

In the method disclosed in U.S. Pat. No. 6,549,646 (Yeh), a clear lung field is divided into multiple zones and individually optimizes nodule detection for each zone. This techniques involves discarding pixels outside the clear lung field which may reduce the ability to detect nodules near the clear lung field boundary.

In U.S. Pat. No. 6,683,973 (Li), an area in a chest radiograph is compared to templates that are characteristic of both normal and abnormal anatomy. The effectiveness of this approach has been considered to be limited because the characteristics of abnormal anatomy can not be anticipated when the templates are created.

Other disclosures related to pulmonary nodule detection in chest radiographs are known, including: U.S. Pat. No. 6,088,473 (Xu), U.S. Pat. No. 6,760,468 (Yeh), U.S. Pat. No. 6,058,322 (Nishikawa), U.S. Pat. No. 6,654,728 (Li), U.S. Pat. No. 6,078,680 (Yoshida), U.S. Pat. No. 6,754,380 (Suzuki), U.S. Pat. No. 5,289,374 (Doi), and U.S. Pat. No. 6,125,194 (Yeh).

Although automatic detection of pulmonary nodules in a chest radiograph has been a topic of research for several years, it remains a challenging problem for several reasons. In a projection chest radiograph normal anatomy and pulmonary nodules are superimposed making them difficult to distinguish. Also, normal anatomy such as rib crossings and pulmonary blood vessels can have the appearance of a pulmonary nodule. In addition, pulmonary nodules vary widely in size, shape, density, and other characteristics.

Accordingly, there still exists a need for automatic detection of pulmonary nodules in a chest radiograph which is robust and overcomes at least one of the disadvantages/problems of existing systems/methods.

SUMMARY OF THE INVENTION

An objective of the present invention to provide a method of detecting pulmonary nodules in a chest radiograph that provides for the detection of nodules that overlap with ribs and other bones in the image.

Another objective of the present invention is to provide a method of detecting pulmonary nodules in a chest radiograph that provides for the detection of nodules that occur at the boundary of the clear lung field.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

The present invention is directed to the automatic detection of pulmonary nodules in a chest radiograph.

According to one aspect of the present invention, there is provided a method of generating a pulmonary nodule image from a chest radiograph. The method includes the steps of: producing a map of a clear lung field; removing low frequency variation from the clear lung field to generate a level image; and performing at least one grayscale morphological operation on the level image to generate a nodule-bone image.

According to another aspect of the present invention, there is provided a method of detecting pulmonary nodules from a chest radiograph. The method includes the steps of: producing a map of a clear lung field; removing low frequency variation from the clear lung field to generate a level image; setting a region outside of the clear lung field in the level image to code values that are low relative to the code values in the clear lung field; performing at least one grayscale morphological operation on the level image to generate a nodule-bone image; identifying candidate nodule locations in the nodule-bone image; segmenting a region around each candidate nodule location in the nodule-bone image; and using the features of the segmented region to determine if a candidate is a nodule.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
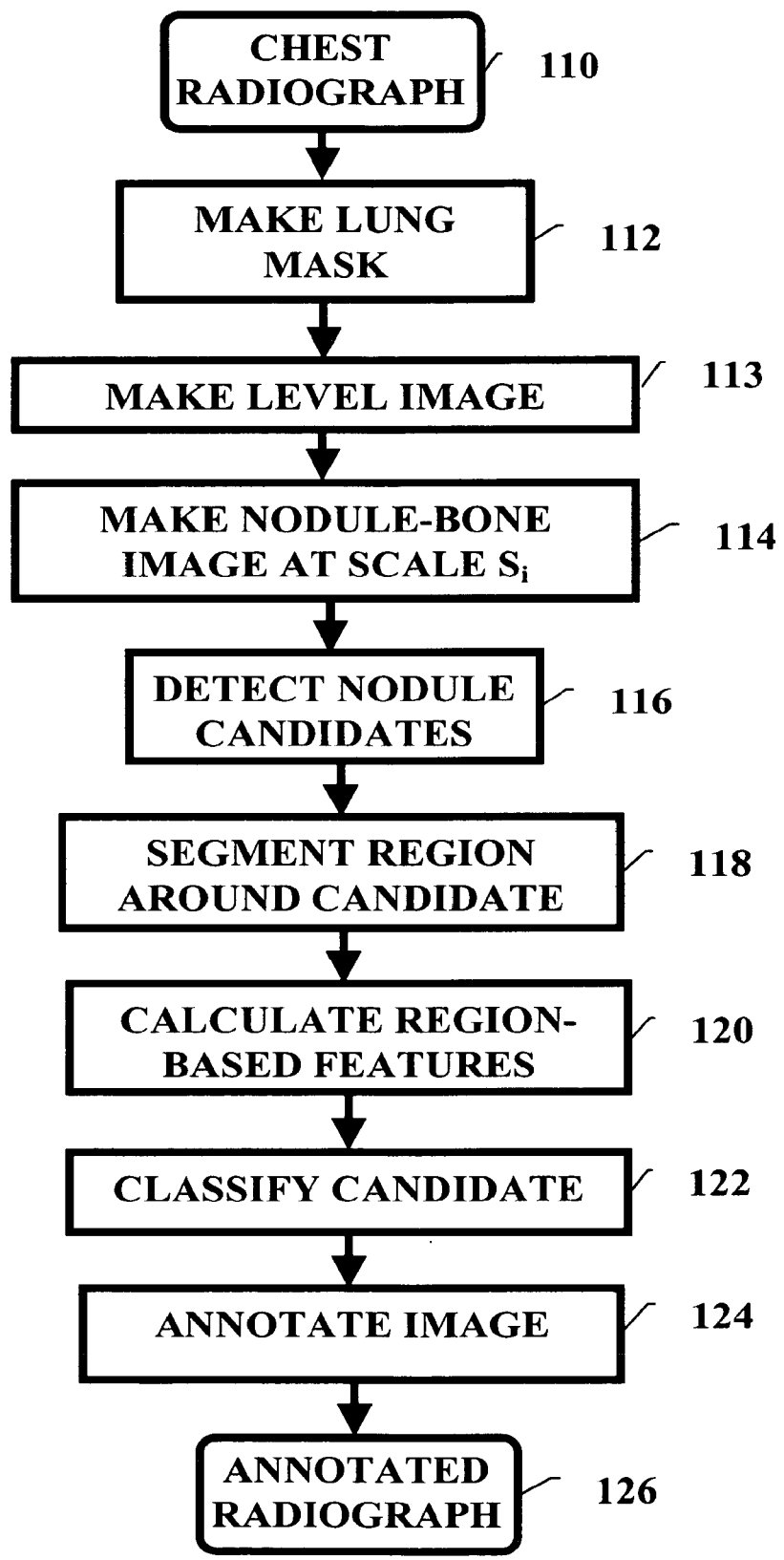
FIG. 1 is an diagram generally illustrating the method of pulmonary nodule detection in a chest radiograph in accordance with the present invention.

The following is a detailed description of the preferred embodiments of the invention, reference being made to the drawings in which the same reference numerals identify the same elements of structure in each of the several figures.

FIG. 1 shows a flowchart generally illustrating a method of pulmonary nodule detection in accordance with the present invention.

A chest radiograph (i.e., a chest image) is an input to a nodule detection system, as shown at step 110. The code value metric of the radiograph may be log exposure at the image detector; P-values as described in Part 14 of the DICOM standard; or any other image representation. If desired, the image can be scaled so that the spacing between pixels corresponds to a distance in the image plane of 0.171 mm.

In step 112 a lung mask is calculated from the chest radiograph which indicates the clear lung field (CLF) in the image. Generally, the clear lung field is divided into a left and right clear lung field that is separated by the mediastinum. Known method of determining the lung mask can be employed, such as those are described in commonly assigned U.S. Ser. No. 10/994,714 titled SEGMENTING OCCLUDED ANATOMICAL STRUCTURES IN MEDICAL IMAGES, filed on Nov. 22, 2004, and U.S. Ser. No. 10/315,884 titled METHOD FOR AUTOMATED ANALYSIS OF DIGITAL CHEST RADIOGRAPHS, filed on Dec. 10, 2002), both of which are included herein by reference.

At step 113 the image is placed in a standard form so that subsequent steps are unaffected by input image variation. The image is scaled to achieve aim code value statistics. In addition, low frequency variation within the clear lung field is removed. The output image from this step is referred to as a "level image."

Step 114 is employed to create an image in which nodules are emphasized and bones are deemphasized. This image is referred to as a "nodule-bone image." Step 114 is performed at several different scales in order to emphasize nodules of different size. In an embodiment of this invention, this step is performed for small size nodules that range in diameter from about 0.5 to about 1.5 cm and for medium size nodules that range in diameter from about 1.5 to about 3.0 cm. Processing for small nodules is generally referred to as scale 0 processing while processing for medium nodules is generally referred to as scale 1 processing.

At step 116, candidate locations of nodules are detected at each of the scales that were considered in step 114. The candidates detected at each scale are merged into a list of candidates. Information on the scale at which a candidate was detected is retained.

Step 118 is employed to segment a region around each candidate that, in the case that a candidate coincides with an actual nodule, defines the boundary of the nodule in the image.

In step 120, features are calculated based on the segmented region. These features can be based on the size, shape, texture, gradient, and other characteristics of the segmented region.

In step 122, candidate features that were calculated in step 120 (and any features calculated in step 116, as will be more particularly described below) are used to classify each detected candidate as a "nodule" or "non-nodule."

At step 124, the chest image is annotated with marks (or other indicia) that show the locations at which nodules were detected. The annotation may comprise circles that are centered at the location of candidates; circles that are centered at the center of the segmented regions; the boundary of the segmented region; or any type of marks that indicate detection results.

The annotated radiograph can then be printed, stored, transmitted, viewed, or the like (step 126).

Figure 2:
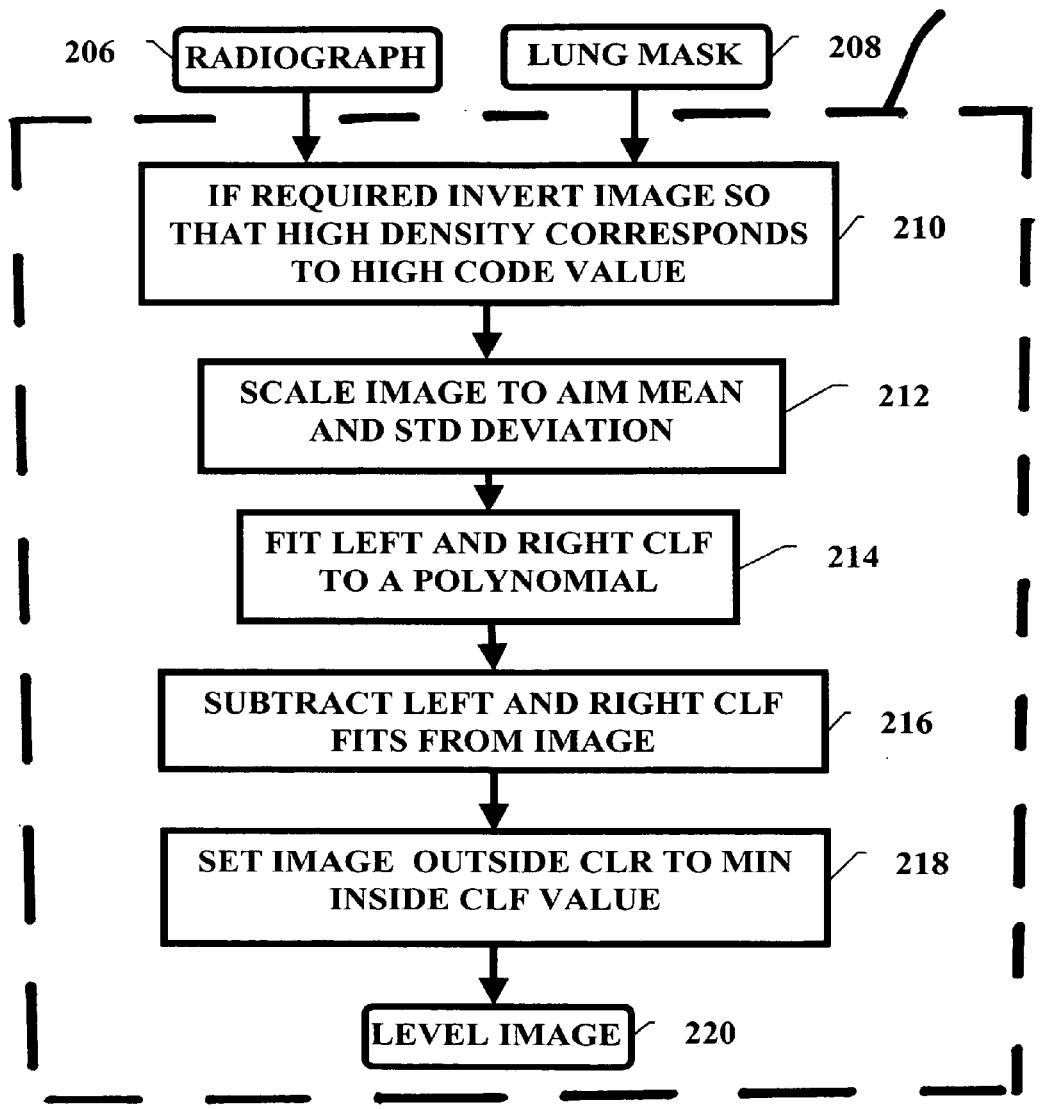
FIG. 2 is a diagram illustrating the method of creating a level image.

Step 113 is now more particularly described. The method of making the level image (step 113 in FIG. 1) is now more particularly described with reference to FIG. 2 using chest radiograph 206 and the lung mask 208.

In step 210, if desired, the image can be inverted so that high x-ray attenuation (i.e., density) corresponds to high code value in the image. At this point bony regions in the image have high code value relative to regions in the image that contain mostly air or soft tissue.

In step 212, the image is scaled so that a mean code value and standard deviation of the entire image substantially equal aim values. Example aim mean code value and standard deviation are 2000 and 500, respectively. In one embodiment of the present invention, the entire image is scaled. In another embodiment of the present invention, the aims are employed for code values within the clear lung fields. In this embodiment, the code values in the left and right clear lung fields are scaled independently.

Several steps of the present invention are motivated by considering an image as a relief map wherein the elevation at a pixel in the image is directly proportional to the pixel's code value. Consequently, in step 214, the left and right clear lung fields are individually fitted to a slowly varying function. For example, a second order bivariate polynomial can be used. Subsequently, in step 216, the fitted functions for the left and right clear lung field are subtracted from the image. In this image, very low frequency trends in the clear lung field are removed. At step 218, code values outside the clear lung field the are set to the minimum value of the image within the clear lung field. This facilitates the detection of nodules at the boundary of the clear lung field. The level image results (step 220).

Figure 3:
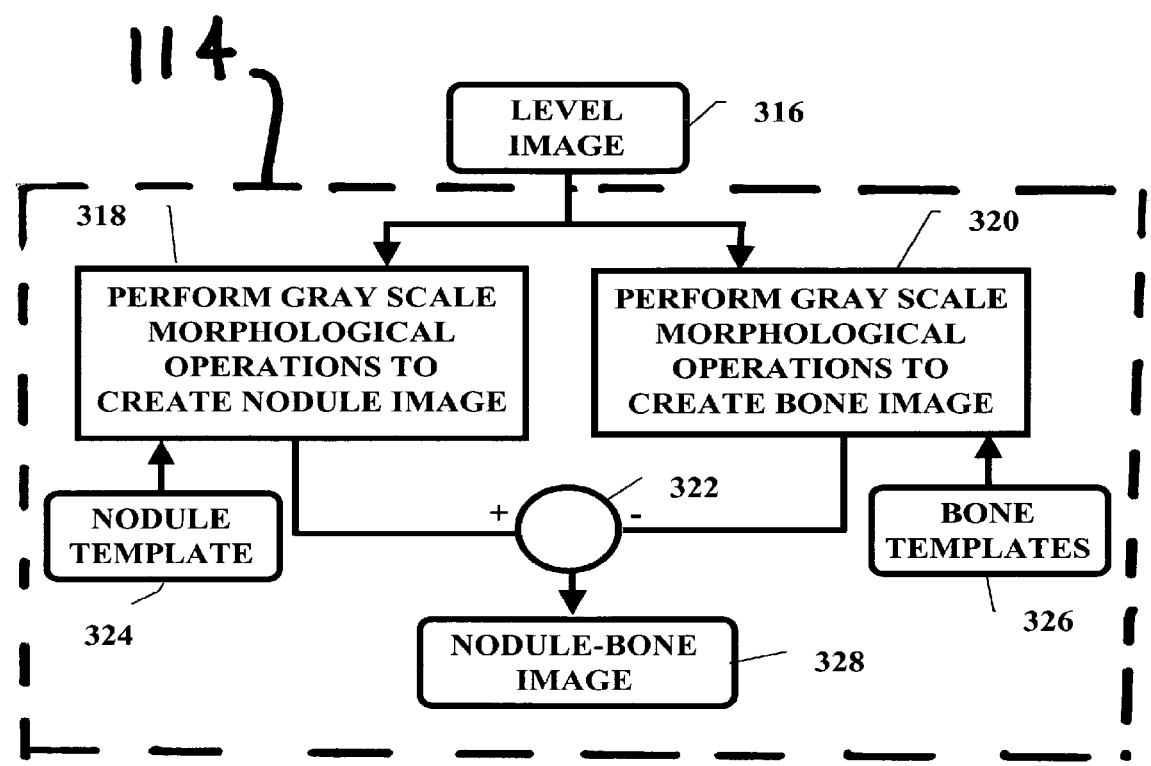
FIG. 3 is a diagram illustrating the method of creating a nodule-bone image.

Step 114 of FIG. 1, the method of creating the nodule-bone image, is now more particularly described with reference to FIG. 3 using level image 316.

Step 318 is employed to modify the level image so that nodules are emphasized and other image content is reduced. Step 320 is employed to modify the level image so that bones are emphasized and other image content is reduced. Both steps 318 and 320 utilize grayscale morphologic operation. Such an operation is know, for example, as described by J. Serra, in "Image Analysis and Mathematical Morphology," Vol. 1, Academic Press, 1982, pp. 424-478.

In step 318, a grayscale morphological operation is performed on the level image using a nodule template 324 to produce a "nodule image." As known to those skilled in the art, a nodule template is a small image in which the pixel code values are a bivariate normal distribution that is centered at the middle of the image. The standard deviation of the normal distribution determines the scale at which preprocessing is performed.

Step 320 performs a grayscale morphological operation with a template that is characteristic of bones that appear in a chest radiograph. The template is preferably of an image of a long thin bone-like object. However, the required orientation of the bone-like object in the template depends on location in the level image. In the present invention, grayscale morphological operations are preferably performed with several bone-like templates (element 326 in FIG. 3). In one embodiment proposed by Applicants, seven templates are used with the orientation of the bone-like structure equal to −68°, −45°, −22°, 0°, +22°, +45°, and +68°. The code value of a pixel in the resultant "bone image" is the maximum result of the grayscale morphological openings with the bone templates performed at the pixel.

The bone image (from step 318) is subtracted from the nodule image (from step 320) at step 322 to result in nodule-bone image 328. In the resultant nodule-bone image, image content that is characteristic of a pulmonary nodule has positive code values, image content that is characteristic of bone has relatively negative code values, and other image content has code values that are close to zero.

Step 116 of FIG. 1, the method of identifying candidate nodule locations, is now more particularly described with reference to FIG. 4 using nodule-bone image 406 and lung mask 408. It is noted that the method of identifying candidate nodule locations is performed on each nodule-bone image that is generated by step 114 (diagrammed in FIG. 3).

Figure 4:
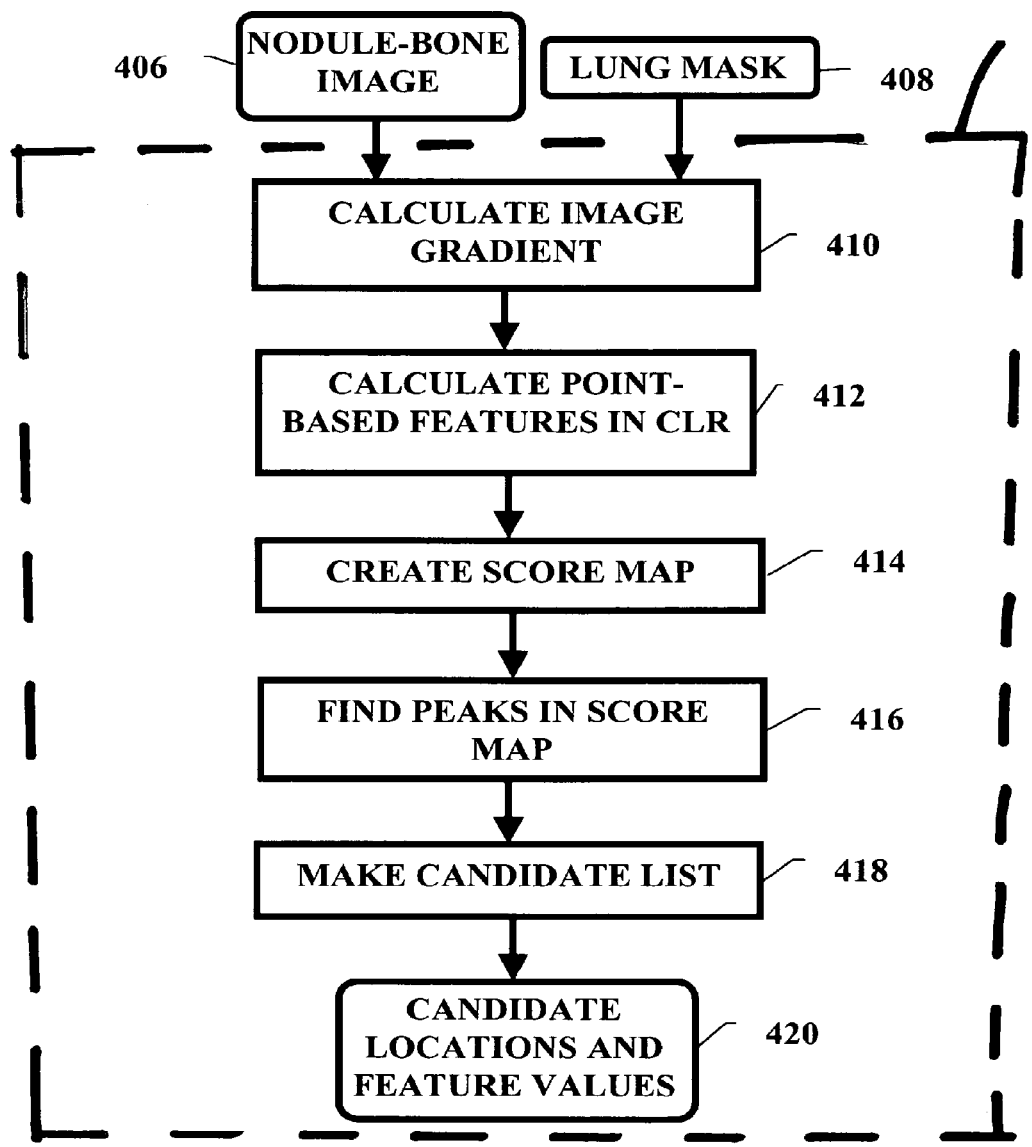
FIG. 4 is a diagram illustrating the method of locating candidate nodules.

Still referring to FIG. 4, the gradient of the nodule-bone image is calculated at step 410. This can be accomplished by, first, the image with code values Cij being blurred in order to remove noise. Next, calculating the Sobel gradient. The resultant gradient image has a gradient magnitude $M_{ij}$ and gradient direction $G_{ij}$.

Figure 5:
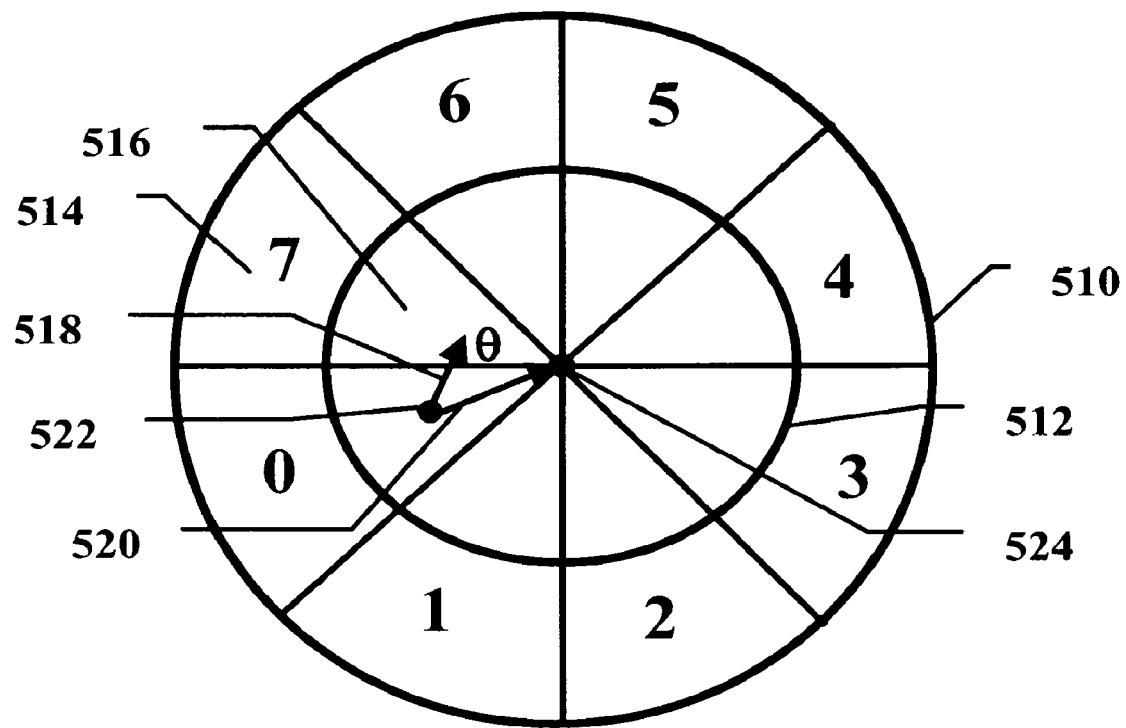
FIG. 5 is a diagram illustrating the method of calculating point-based features.

In step 412, at each pixel in the clear lung field point-based features are calculated. The calculation of these features are now more particularly described with reference to FIG. 5. As shown in FIG. 5, an inner circle 512 and an outer circle 510 are conceptualized around a pixel-of-interest (POI) 524 in the image. The size of these circles depends on the size range of nodules that are to be detected. (This is preferably consistent with the size of the nodule template that was used to generate the nodule-bone image in step 318 in FIG. 3.)

The circles 512 and 510 shown in FIG. 5 can be divided into S sectors. In the figure, eight sectors are shown numbered 0 through 7. Each sector is comprises an inner sector that lies inside the inner circle and an outer sector that lies between the outer and inner circles. For example, 516 depicts the inner sector of sector 7 and 514 depicts the outer sector.

A gradient feature is calculated at a POI 524 as follows. Consider a pixel 522 in sector 0 inside the inner radius. The gradient direction at this pixel 518 is shown in FIG. 5. The direction to the POI 520 is also shown. The angle between the directions 518 and 520 is θ. In the case wherein a nodule is present and centered at the POI 524 and pixel 522 is within the nodule, then the value of cos θ should be close to 1.0. However, if the magnitude M of the gradient is small, then the direction is unreliable and should not be used to provide evidence for a nodule centered at the POI. Furthermore, if the magnitude is large, pixel 522 may be located at a bone edge and should also not be used as evidence. Based on such considerations, a feature is calculated at POI with indexes ij based on pixels mn in sector k inside the inner radius that are also inside the clear lung field using the equation:

$$\psi_{ij}^k = \frac{1}{N_k} \sum_{mn \in innersector k} \cos\theta_{mn}$$

-continued
$$t_1 \leq M_{mn} \leq t_2$$

wherein $t_1$ and $t_2$ are the low and high gradient magnitude threshold, respectively and variable $N_k$ equals the number of clear lung field pixels in inner sector k.

The above equation provides evidence for a nodule at the POI based only on pixels within the inner circle in sector k. If a nodule is centered at the POI, it is expected that $\psi_{ij}^k$ will be large and uniform over all K sectors. Based on these considerations the gradient feature is defined by:

$$PtGrad_{ij} = \frac{\overline{\psi}_{ij}}{\sigma_{ij}}$$

wherein $$\overline{\psi}_{ij} = \frac{1}{S}\sum_{k=0}^{S}\psi_{ij}^k$$

$$\sigma_{ij} = \sqrt{\frac{1}{S}\sum_{k=0}^{S}(\psi_{ij}^k - \overline{\psi}_{ij})^2}$$

Further evidence of the presence of a nodule centered at the POI with a size of approximately that of the inner circle 512 in FIG. 5 is that the code values in this inner circle are generally higher than in the surrounding region between the inner circle 512 and the outer circle 510. In FIG. 5, 514 is the area in region 7 between the inner and outer circles. This is measured in sector k using the equation:

$$\delta_{ij}^k = \frac{1}{N_k^{inner}}\sum_{mn \in innersector k} C_{mn} - \frac{1}{N_k^{outer}}\sum_{mn \in outersector k} C_{mn}$$

wherein $C_{mn}$ is the code value of pixel mn, $N_k^{inner}$ is the number of clear lung field pixels in inner sector k, and $N_k^{outer}$ is the number of clear lung field pixels in outer sector k.

If a nodule is centered at the POI and contained within the inner circle, it is expected that $\delta_{ij}^k$ will be large and uniform over all S sectors. Based on these considerations the density feature is defined by:

$$PtDensity_{ij} = \frac{\overline{\delta}_{ij}}{\sigma_{ij}}$$

wherein $$\overline{\delta}_{ij} = \frac{1}{S}\sum_{k=0}^{S}\delta_{ij}^k$$

$$\sigma_{ij} = \sqrt{\frac{1}{S}\sum_{k=0}^{S}(\delta_{ij}^k - \overline{\delta}_{ij})^2}$$

Note that the features that are calculated in step 412 (PtGrad and PtDensity) have the prefix Pt at the beginning of their name to distinguish them as point-based features. Region-based features are described below.

Referring again to FIG. 4, at step 414 a score map is produced based on code values in the nodule-bone image and the gradient and density features described above. In the nodule-bone image, nodule regions generally have positive code values. Therefore, the score $S_{ij}$ is zero in the score map if the corresponding pixel in the nodule-rib image is less than or equal to zero. The score is also set to zero if $\Psi_{ij}$ or $\Delta_{ij}$ are smaller or equal to zero. Otherwise the score $S_{ij}$ equals $\Psi_{ij}$.

In step 416, local peaks are found in the score map. These peaks are candidate nodule locations. Preferably, if the distance between two peaks is less than a minimum distance, then a candidate is created only from the peak with the highest score.

The candidates are then added to a list that is sorted in order of decreasing score (step 418). A candidate list is created for each scale at which processing occurs. Usually, processing at a fine scale generates more candidates than processing at a courser scale. In one embodiment of the present invention employed by the Applicants, the candidates selected for further processing included the 40 candidates with the highest score that were identified at scale 0 and the 30 candidates with the highest score that were identified at scale 1.

The result (at step 420) is the detected candidate locations and feature values.

The method of segmenting a region around a candidate, step 118 in FIG. 1, is more particularly described with reference to FIG. 6. In the situation wherein a candidate is located in a nodule, the intent of this segmentation method is to identify the boundary of the nodule in the image. The inputs to this method are nodule candidates 606 and nodule-bone image 608 for the scale at which the nodule was identified.

In step 610, a region-of-interest (ROI) is cut from the nodule-bone image 608 in which the candidate is located at the center and at a desired image size (e.g., image size of 512×512). Various ROI sizes can be used, but the ROI is preferably larger than the largest nodule that is to be detected.

In the next step (step 612), a threshold is applied to the ROI to create an initial region map. In the nodule-bone image, regions with positive code values have nodule-like characteristics. Applying a low positive threshold to the image creates a map of nodule-like regions in the ROI. The region map is a binary image of substantially the same size as the ROI. A pixel in the region map is set to 255 if the corresponding pixel in the ROI is greater than or equal to the threshold and is inside the clear lung field. Otherwise, the map pixel is set to zero.

If the ROI contains a nodule, the region map after step 612 will usually include the nodule plus other image regions that appear nodule-like. In step 614, the region map is eroded using a binary morphological operation, such as described by J. Serra, in "Image Analysis and Mathematical Morphology," Vol. 1, Academic Press, 1982, pp. 34-62. The erosion breaks connections between a nodule region and other regions in the region map.

Next, at step 616, the connected region in the region map that includes the candidate is retained while all other regions are remove by setting their pixels to zero. Then, in step 618, the region map is dilated using the same kernel as in step 614 in order to reverse the erosion on the selected region.

Following step 618, the region map comprises a single connected region that is interpreted as the region of support for a nodule. The following steps refine the region map.

In step 620, peaks are found in the nodule-bone image within the region of support.

In step 622, the peaks that are found in step 620 are used to initialize a watershed segmentation algorithm. Suitable watershed segmentation is described by Vincent and Soille in "Watersheds in Digital Spaces: An Efficient Algorithm Based on Immersion Simulations," IEEE Trans. Patt. Anal. Machine Intell., Vol. 13, no. 6, pp. 583-598, 1991. For the purpose of watershed segmentation, the ROI is inverted so that the peaks become minima. The region of support in the ROI is divided into catchment basins. Each minima has a catchment basin associated with it.

At step 624, the non-inverted ROI is used so the region of support comprises one or more peaks each with a cluster of connected pixels that correspond to the catchment basin as determined in step 622. Pulmonary nodules often appear as several distinct masses in a radiograph. This is especially the situation for medium and large size nodules. The intent of step 624 is to determine which clusters should be included in the nodule region. The nodule region is initialized with the primary cluster, which is the cluster that contains the candidate location. Next, connected clusters are added. Connected clusters are identified by drawing a line between the peak in the primary cluster and all other peaks. If the minimum code value on this line is greater than a threshold, that is based on the code value of the two peaks, the cluster is said to be connected and is added to the nodule region. In an embodiment of this invention the threshold is half the average code value at the two peaks. The process of added clusters to the nodule region is recursive. When a cluster is added other clusters that are connected to it are also added.

Figure 6:
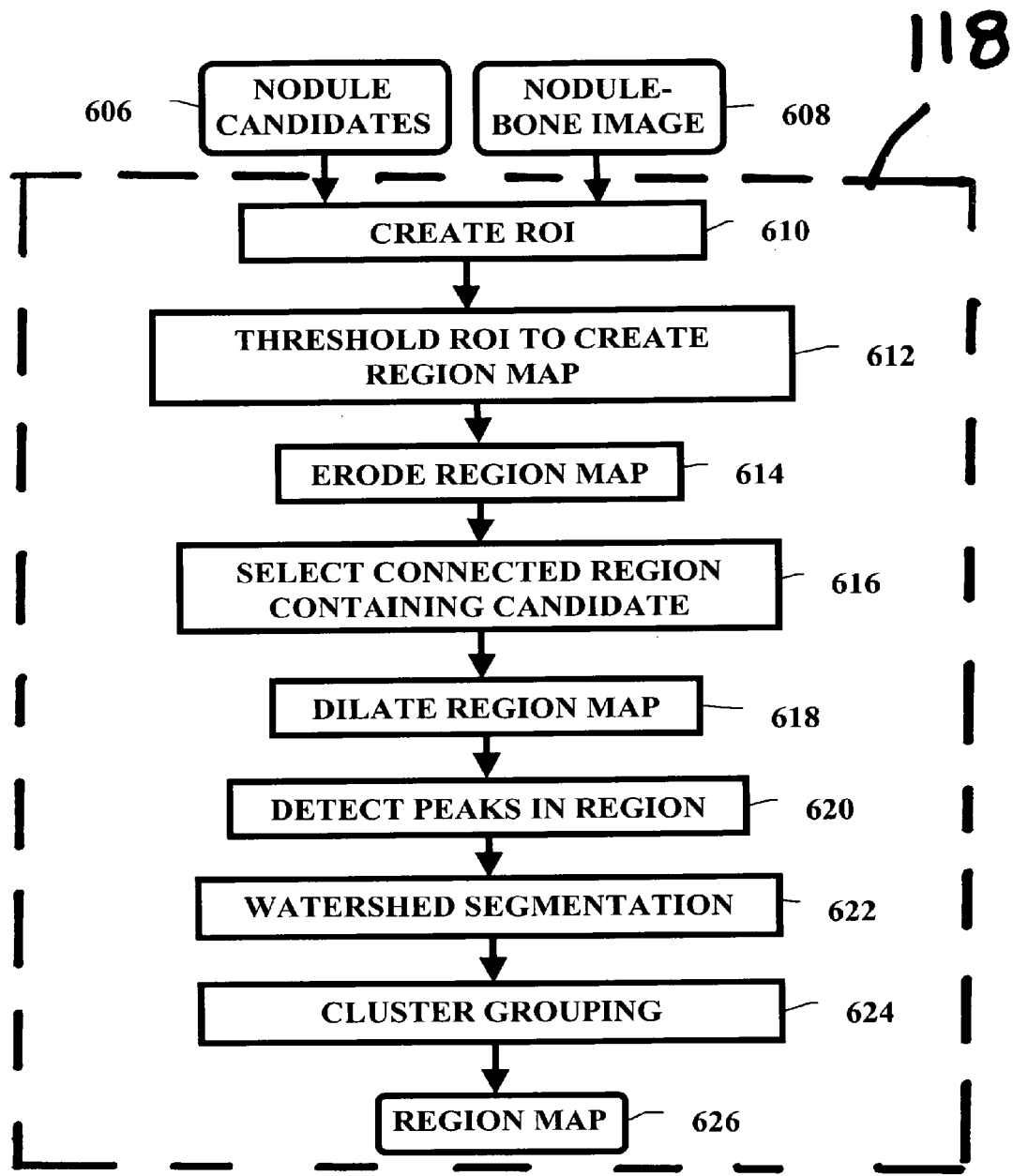
FIG. 6 is a diagram illustrating the method of segmenting a region around a candidate.

The final output of the method diagrammed in FIG. 6 at step 626 is a region map that marks a region around a candidate. In the situation wherein the candidate is within a pulmonary nodule, the region coincides with the extent of the nodule in the image. If the candidate is not within a nodule, the region includes other image content. In some situations the region segmentation method fails. For example, in step 612 or 614, there may be no pixels in the region. When segmentation fails, the region map is blank (e.g., all code values are zero) and the area associated with the candidate is zero.

The method of calculating region-based features shown in step 120 of FIG. 1 is now more particularly described with reference to FIG. 7. The input to region-based feature calculation are the level image 710, nodule-bone image 712, and region map 714.

Figure 7:
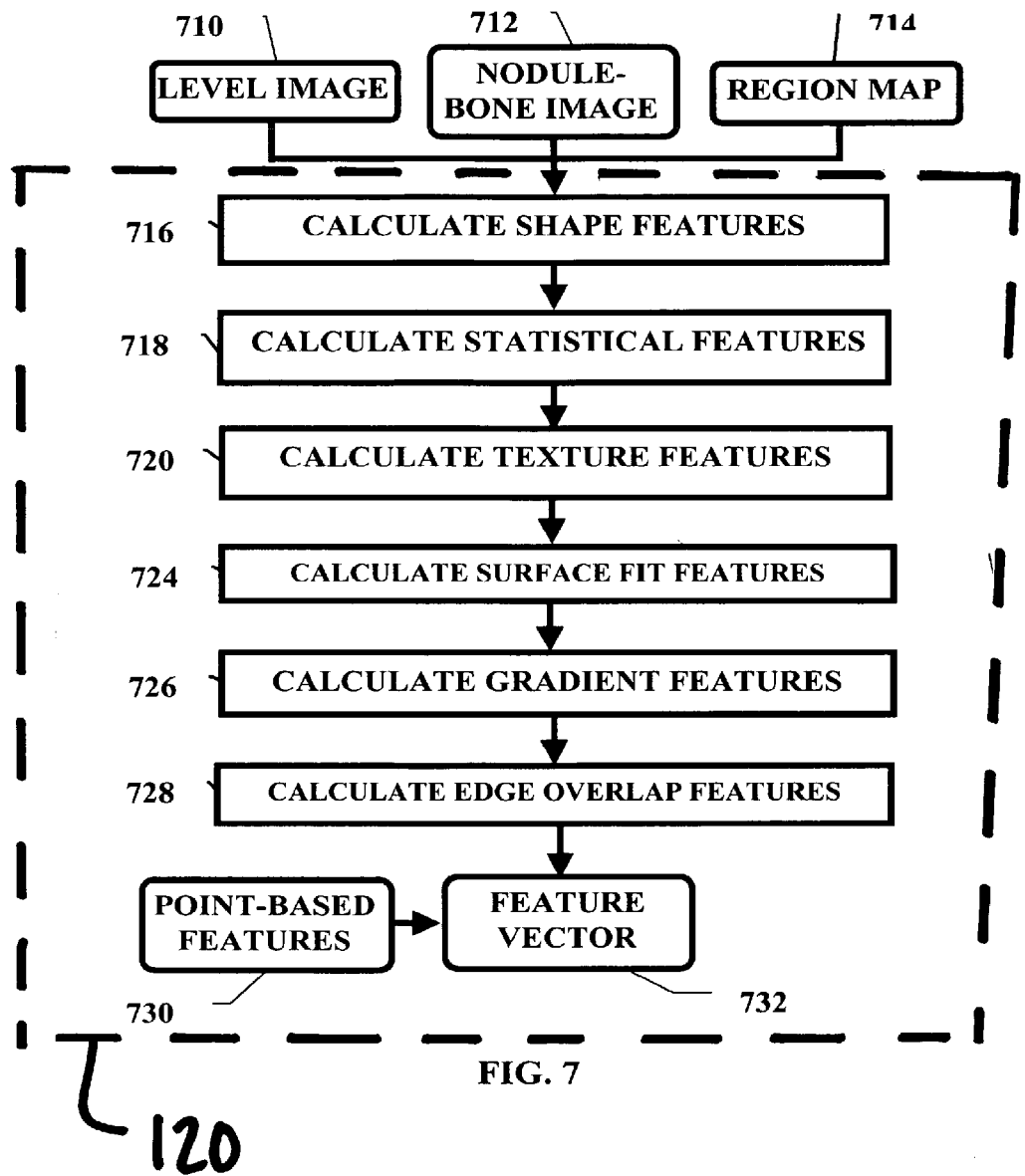
FIG. 7 is a diagram illustrating the method of creating a feature vector for a candidate that contains both point and region-based features.

In step 716 of FIG. 7, the features that are based on the shape of the region are calculated. The shape features are defined by the following set of equations:

$$Shape_1 = A_{region}$$

$$Shape_2 = \frac{D_{major}}{D_{minor}}$$

$$Shape_3 = \frac{A_{region}}{A_{convex\,hull}}$$

$$Shape_4 = 1 - \frac{d_{candidate\text{-}center}}{\sqrt{A_{region}/\pi}}$$

The shape feature $Shape_1$ is the normalized area of the region. This and the other features that measure length or area must be normalized so that they are independent of the magnification and resolution of the imaging system. The feature $Shape_2$ is the aspect ratio of an ellipse that is fitted to the region. $Shape_3$ is the ratio of the region's area to the area of its convex hull. Finally, $Shape_4$ is the distance between the center of the region and the position of the candidate, as determined by the method in FIG. 4, divided by the effective radius of the region.

Referring now to step 718, features are calculated based on the difference in code value statistics of the region and its surroundings. A surrounding region map is produced by dilating the region map and then subtracting pixels that are in the region map or outside of the clear lung field. The features are:

$$Stat_1 = \mu^{region} - \mu^{surround}$$

$$Stat_2 = \sigma^{region} - \sigma^{surround}$$

$$Stat_3 = \min^{region} - \min^{surround}$$

$$Stat_4 = \max^{region} - \max^{surround}$$

wherein $\mu$, $\sigma$, min, and max are the mean code value, code value standard deviation, minimum code value, and maximum code value, respectively. The statistics features are calculated for both the level and nodule-bone images.

In step 720, features that are based on texture in the region are calculated. These features are calculated for the code values, the gradient magnitude, and gradient direction in the level image. The features can be based on the cooccurrence function, such as describe by Bevk and Kononenko in "A Statistical Approach to Texture Description of Medical Images: A Preliminary Study," 15th IEEE Symposium on Computer-Based Medical Systems, Jun. 4-7, 2002. The texture features are given by the equations:

$$Texture_1 = \sum_{ij} [C(i, j)]^2$$

$$Texture_2 = \sum_{ij} (i-j)^2 C(i, j)$$

wherein $C(i,j)$ is the cooccurrence function calculated over neighboring pixels and the summations range from minimum to maximum code value. The feature $Texture_1$ is referred to as the energy and $Texture_2$ as contrast. Other texture features, such as described by Haralick et al. in "Texture Features for Image Classification," IEEE Transactions on Systems, Man, Cybernetics, pp. 610-621, 1973, can be used.

In step 724, the nodule-bone image is interpreted as a relief map in which the code value is a measure of elevation. In a preferred embodiment, the nodule-bone image, in the segmented region, is fitted to a 4'th order bivariate polynomial. The principle curvatures are calculated at the point of highest elevation in the region, such as described by Abmayr et al. in "Local Polynomial Reconstruction of Intensity data as Basis of Detecting Homologous Points and Contours with Subpixel Accuracy Applied on IMAGER 5003," Proceedings of the ISPRS working group V/1, Panoramic Photogrammetry Workshop, Vol. XXXIV, Part 5/W 16, Dresden, 2004. Second-order derivatives of the fitted polynomial are calculated which form the elements of the Hessian matrix. The maximum and minimum eigenvalue of the Hessian matrix $\lambda_{max}$ and $\lambda_{min}$ are the principle curvatures. The surface features are given by:

$$Surface_1 = \lambda_{min}$$

$$Surface_2 = \lambda_{max}$$

$$Surface_3 = \lambda_{min} \lambda_{max}$$

At step 726 of FIG. 7, the gradient in the segmented region in the nodule-bone image is used to calculate gradient features. The gradient features are similar to the features that were calculated as part of the candidate detection method of step 116 as performed in steps 410 and 412 (shown in FIGS. 4 and 5). However, for these features, pixels in the segmented region contribute to the gradient calculation instead of pixels in a circle region of fixed size. The origin for the gradient calculation is the pixel with the maximum code value in the region.

For each pixel in the region, the angle $\phi$ between the x-axis and a line from the pixel to the origin is calculated. In addition, the angle $\theta$ between a vector that points to the origin and the gradient direction is also calculated. If the gradient magnitude is between a lower threshold $t_1$ and upper threshold $t_2$ $\cos \theta$ is accumulated in S bins which span the range of $\phi$ values from 0° to 360°. This leads to the following equations:

$$\psi^k = \frac{1}{N_k} \sum_{mn \in region} \cos\theta_{mn}$$

$$t_1 \le M_{mn} \le t_2$$

$$\frac{360°}{S} k \le \phi_{mn} < \frac{360°}{S}(k+1)$$

wherein k is an integer from 0 to S−1, $M_{mn}$ is the gradient magnitude at pixel mn, and $N_k$ equals the number of pixels in the region for which the above condition for $\phi$ is satisfied. The gradient feature for the region is given by:

$$Grad_1 = \frac{\overline{\psi}}{\sigma}$$

wherein $$\overline{\psi} = \frac{1}{S} \sum_{k=0}^{S} \psi^k$$

$$\sigma = \sqrt{\frac{1}{S} \sum_{k=0}^{S} (\psi^k - \overline{\psi})^2}$$

The final feature, which is calculated in step 728, is intended to reduce/eliminate bone crossings as false positives. The Canny edge detector, as described by Canny in "A Computational Approach to Edge Detection," IEEE Transactions on Pattern Analysis and Machine Intelligence, Vol. 8, No. 6, 1986, can be used to find prominent edges in the level image within the clear lung field. Connected edge pixels are then formed into chains. A chain map is created that includes only chains that satisfy a minimum length and straightness criteria. The chains in this map correspond to bone edges in the image. The overlap feature is defined by:

$$Overlap_1 = \frac{L_{overlap}}{L_{region}}$$

wherein $L_{region}$ is the length of the region boundary and $L_{overlap}$ is the length of the region boundary that coincides with a chain in the chain map.

The output of the method in Figure is a feature vector 732 which includes one or more (preferably all) of the region-based features that were calculated in the method diagrammed in FIG. 7. In addition, the point-based features 730 which were calculated in step 412 (of FIG. 4) are preferably included in the feature vector.

Steps 122 and 124 of FIG. 1 are more particularly described with reference to FIG. 8. In the method diagrammed in FIG. 8, the feature vectors 810 for the candidates are input to a classification step 812. In an embodiment of the present invention, a Gaussian maximum likelihood (GML) classifier is employed. However, other classifiers can be used, including a neural network, learning vector quantizer (LVQ), support vector machine, and classifiers that are considered by Anil et al. in "Statistical Pattern Recognition: A Review," IEEE Transactions on Pattern Analysis and Machine Intelligence, Vol. 22, No. 1, pp. 4-37, 2000. Step 812 may include several classifiers. In one embodiment of the present invention, one classifier is used for candidates that have both point and region-based features while another classifier is used for candidates for which region segmentation failed and therefore only point-based features are available.

The classifiers in step 812 can be trained by calculating features and creating feature vectors for confirmed instances of pulmonary nodules in radiographs.

Frequently, two or more candidates occur within the same nodule or other structure in the image. When the region around the candidates is segmented, the region for the two or more candidates is almost the same. Since it is undesirable to annotate the radiograph with duplicate detection results, in step 814 in FIG. 8, candidates with sufficient overlap are grouped together and the one in the group is retained. In one embodiment of the present invention, the candidate with the highest probability as determined in step 812 is retained.

Figure 8:
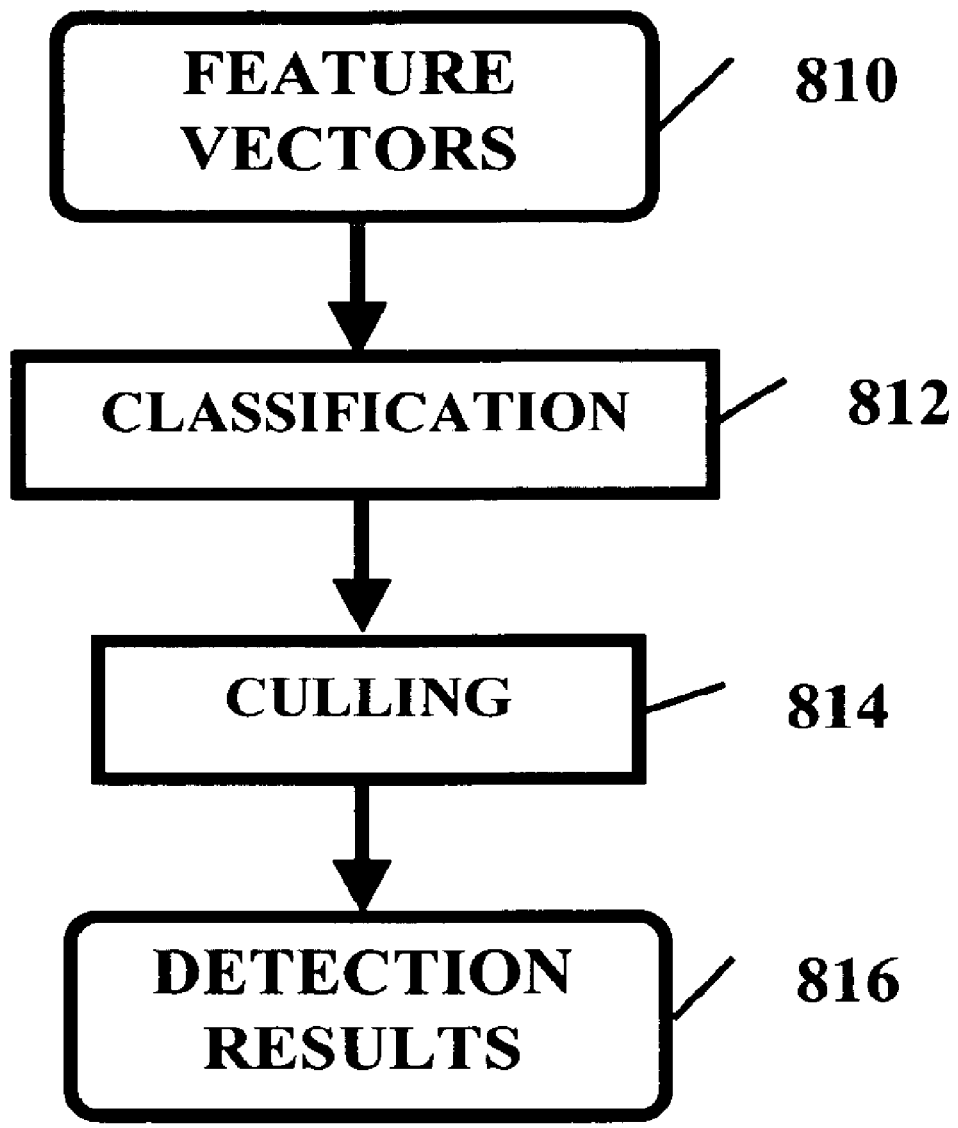
FIG. 8 is a diagram illustrating the method of classifying feature vectors and culling candidates.

The output of the method in FIG. 8 are detection results 818. Detection results 818 comprise feature values, the region boundary, and classification results for all candidates. The detection results are used in step 124 of FIG. 1 for image annotation.

The method of pulmonary nodule detection in the present invention was applied to a set of 47 images from computed radiography (CR) systems and 154 images from film radiographs. This image set contained 216 nodules in the clear lung field. At an operating position with an average of 4 false positives per image, 67% of the nodules were detected.

All documents, patents, journal articles and other materials cited in the present application are hereby incorporated by reference.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A method of generating a pulmonary nodule image from a chest radiograph, the method comprising the steps of:
producing a map of a clear lung field;
removing low frequency variation from the clear lung field to generate a level image;
performing at least one grayscale morphological operation on the level image using a grayscale morphological filter to generate a nodule image;
performing at least one grayscale morphological operation on the level image to generate a bone image; and
generating a nodule-bone image comprising the bone image subtracted from the nodule image.

2. The method of claim 1, wherein the method further comprises the step of, prior to performing the at least one grayscale morphological operation, setting a region outside of the clear lung field in the level image to code values that are low relative to the code values in the clear lung field.

3. The method of claim 1, wherein the method further comprises the step of, prior to performing the at least one grayscale morphological operation, setting a region outside of the clear lung field in the level image to code values different than code values in the clear lung field.

4. The method of claim 1, further comprising the step of displaying, storing, transmitting, or printing the nodule-bone image.

5. A method of detecting pulmonary nodules from a chest radiograph, the method comprising the steps of:
producing a map of a clear lung field;
correcting for non-uniform X-ray illumination and body thickness variation by removing low frequency variation from the clear lung field to generate a level image;
setting a region outside of the clear lung field in the level image to code values that are low relative to the code values in the clear lung field;
performing at least one grayscale morphological operation on the level image using a grayscale morphological filter to generate a nodule-bone image comprising a bone image subtracted from a nodule image, comprising:
performing a first grayscale morphologic operation on the level image using a nodule template to generate a nodule image;
performing a second grayscale morphologic operation on the level image using a bone template to generate a bone image; and
subtracting the bone image from the nodule image to generate the
nodule-bone image;
identifying candidate nodule locations in the nodule-bone image;
segmenting a region around each candidate nodule location in the nodule-bone image; and
using features of the segmented region to determine if a candidate is a nodule.

6. The method of claim 5, wherein more than one grayscale morphologic operations is performed on the level image.

7. The method of claim 5, wherein the features include at least two of the following: shape feature, statistical feature, texture feature, surface fit feature, gradient feature, and edge overlap feature.

8. A computer readable storage medium having computer instructions stored therein causing one or more computers to perform the method of claim 1.

9. A method of generating a pulmonary nodule image from a chest radiograph, the method comprising the steps of:
producing an image of a clear lung field using a mask;
correcting for non-uniform X-ray illumination and body thickness variation by removing low frequency variation from the clear lung field to generate a level image;
performing at least one grayscale morphological operation on the level image using a grayscale morphological filter to generate a nodule image;
performing at least one grayscale morphological operation on the level image to generate a bone image; and
generating a nodule-bone image.

* * * * *